(12) United States Patent
Rave et al.

(10) Patent No.: US 7,890,730 B2
(45) Date of Patent: Feb. 15, 2011

(54) METHODS AND DEVICES FOR EXPANDABLE STORAGE

(75) Inventors: Micha Rave, Herzliya (IL); Eitan Mardiks, Ra'anana (IL)

(73) Assignee: SanDisk IL Ltd, Kfar Saba (IL)

( * ) Notice: Subject to any disclaimer, the term of this patent is extended or adjusted under 35 U.S.C. 154(b) by 483 days.

(21) Appl. No.: 11/963,834

(22) Filed: Dec. 23, 2007

(65) Prior Publication Data

US 2009/0164746 A1 Jun. 25, 2009

(51) Int. Cl.
*G06F 12/00* (2006.01)
(52) U.S. Cl. .................. 711/173; 711/163; 711/170; 711/E12.006
(58) Field of Classification Search .................. None
See application file for complete search history.

(56) References Cited

U.S. PATENT DOCUMENTS

| | | | |
|---|---|---|---|
| 6,178,487 B1 * | 1/2001 | Ruff et al. .................. 711/165 |
| 6,195,732 B1 | 2/2001 | Adams et al. |
| 2002/0188704 A1 | 12/2002 | Gold et al. |
| 2003/0023811 A1 | 1/2003 | Kim et al. |
| 2003/0172228 A1 | 9/2003 | Chu et al. |
| 2004/0193824 A1 | 9/2004 | Johnson |
| 2005/0235128 A1 | 10/2005 | Rustagi et al. |
| 2006/0136761 A1 * | 6/2006 | Frasier et al. .................. 713/320 |
| 2007/0094439 A1 | 4/2007 | Kumar et al. |

* cited by examiner

*Primary Examiner*—Shawn X Gu
(74) *Attorney, Agent, or Firm*—Martine Penilla & Gencarella, LLP

(57) ABSTRACT

Embodiments described herein disclose methods and devices for expanding the storage capacity in a storage device, including the steps of: creating at least one partition in a storage memory of the storage device; designating a reserved-storage area and an enabled-storage area in at least one partition; storing a partition size in a FAT of the storage memory; and upon authorization, increasing the partition size to include sectors in the reserved-storage area, thereby expanding the storage capacity in a storage device. Preferably, the reserved-storage area is not accessible by a host system. Preferably, the partition size is determined from a partition range stored in a master boot record in the storage memory. Most preferably, the partition range is determined from an enabled capacity stored in a memory-management area in the storage memory, and wherein the memory-management area is not accessible by a host system.

22 Claims, 2 Drawing Sheets

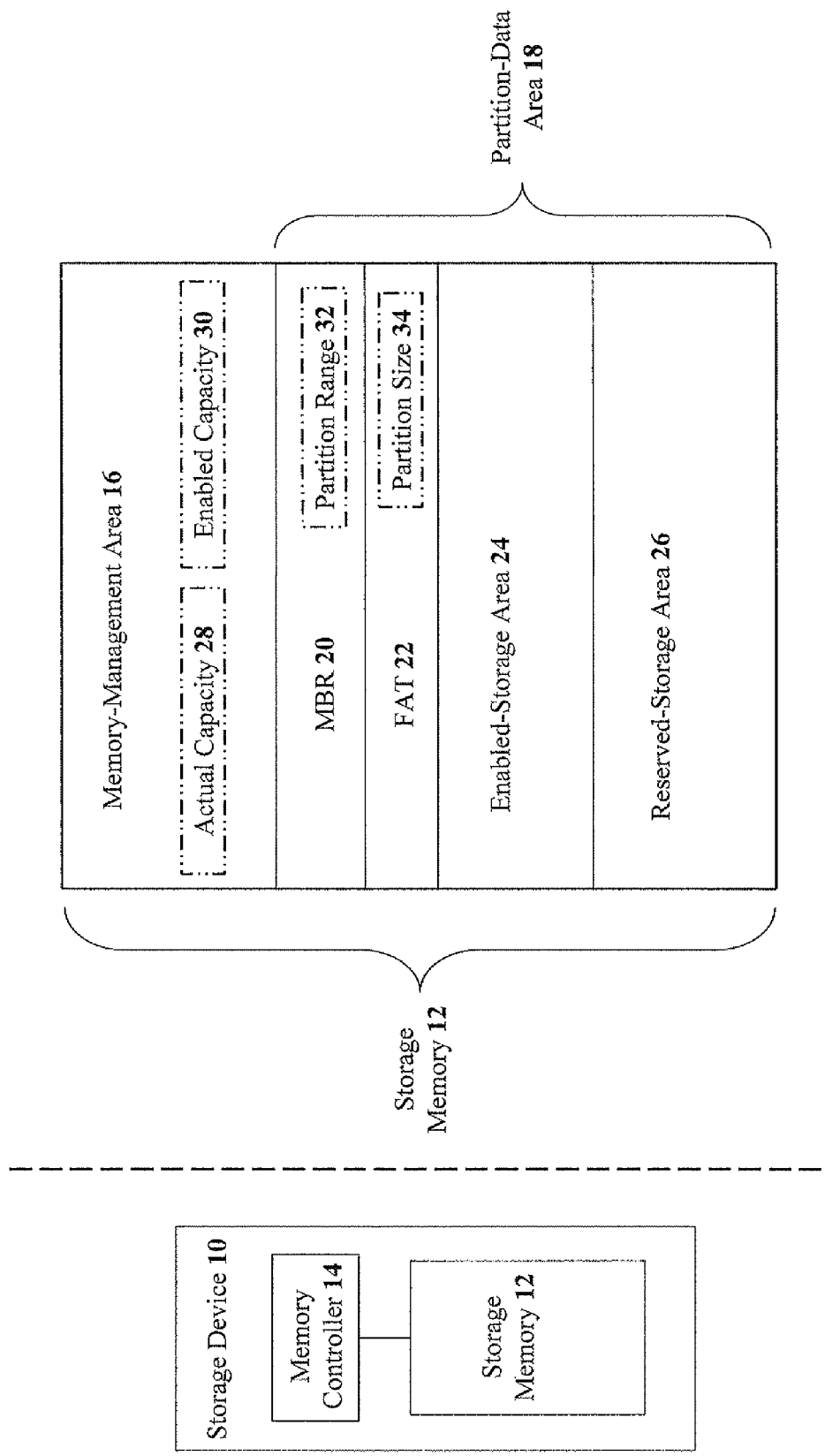

METHODS AND DEVICES FOR EXPANDABLE STORAGE

FIELD AND BACKGROUND OF THE INVENTION

Embodiments described herein relate to methods and devices for expanding the storage capacity in a storage device in which the expansion process is performed solely by the storage device without erasing the existing content on the storage device.

There are techniques known in the prior art for expanding the storage capacity of a storage device via a host system. Some techniques only allow the storage capacity to be enlarged by reformatting the storage device, erasing the existing content in the process. Other techniques typically copy the existing content of the storage device into the host system's memory, reformat the storage device (re-writing any existing partitions and erasing the existing content), enable the expanded storage capacity, and then copy the previously existing content from the host system back into the storage device. Such techniques have limited utility when the host system has little or no storage capacity, and the existing content cannot be lost.

Furthermore, there are several use cases in which there is a incentive for a service provider or a retailer to sell a memory card or other type of storage device having a "logical" capacity which is lower than the "physical" capacity, and allowing the user to purchase additional storage capacity on the same storage device later, without reformatting the storage device and losing the existing content. Current technology requires the user to back-up the existing content, format the storage device, and restore the content back, a tedious and "non-user-friendly" operation.

Currently, it is possible to create several partitions in a storage device, disable some partitions, and re-enable the disabled partitions later upon request. Such an approach has several drawbacks. First, it is less convenient for a user to work with several partitions. For example, when working with large files, the storage utilization is less efficient. Second, working with partitions is limited. For example, Microsoft Windows® XP does not support partitions on removable devices. Furthermore, mobile handsets having proprietary operating systems (OS) that typically do not support memory-card partitions.

It would be desirable to have methods and devices for expanding the storage capacity in a storage device in which the expansion process is performed solely by the storage device without erasing the existing content on the storage device.

SUMMARY OF THE INVENTION

It is the purpose of embodiments described herein to provide methods and devices for expanding the storage capacity in a storage device in which the expansion process is performed solely by the storage device without erasing the existing content on the storage device.

Embodiments described herein enable a storage device with a certain capacity to be expanded later in time. A unique feature of such a capability is that such a storage device allows the manufacturer to manufacture highly-efficient, large-capacity storage modules that function as storage devices with a desired limited capacity. The manufacturer can then sell storage devices to consumers with various storage capacities to meet various consumers' needs for value (i.e. price and performance), while enabling the manufacturer to run fewer manufacturing lines for the various storage capacities (maximizing economies of scale). The consumer can then choose to "upgrade" the storage device by purchasing additional storage capacity on the same storage device.

Embodiments described herein teach methods for expanding the capacity of an existing partition in a storage device without losing the content already stored in the partition. The methods provide appropriate security mechanisms for preventing a hacker from tampering with the storage device to enlarge a partition without authorization. The methods also enable a service provider or the storage device to securely enlarge a partition in a storage device from a remote location.

Therefore, according to embodiments described herein, there is provided for the first time a method for expanding the storage capacity in a storage device, the method including the steps of: (a) creating at least one partition in a storage memory of the storage device; (b) designating a reserved-storage area and an enabled-storage area in at least one partition; (c) storing a partition size in a FAT of the storage memory, wherein the partition size corresponds to a size of the enabled-storage area; and (d) upon authorization, increasing the partition size to include sectors in the reserved-storage area, thereby expanding the storage capacity in a storage device.

Preferably, the reserved-storage area is not accessible by a host system.

Preferably, the partition size is determined from a partition range stored in a master boot record in the storage memory, and wherein the partition range corresponds to a sector range of the enabled-storage area.

Most preferably, the partition range is determined from an enabled capacity stored in a memory-management area in the storage memory, and wherein the memory-management area is not accessible by a host system.

Preferably, the authorization is performed using a key provided to the storage device from a host system.

Preferably, the steps of creating, designating, storing, and increasing are performed by a memory controller in the storage device.

Preferably, the method further includes the step of: (e) reformatting the storage memory only upon receiving a permission verification.

Preferably, the step of increasing is performed without erasing content stored in the storage memory.

According to embodiments described herein, there is provided for the first time a storage device for enabling expansion of the storage capacity in the storage device, the device including: (a) a storage memory having at least one partition; and (b) a memory controller configured: (i) to designate a reserved-storage area and an enabled-storage area in at least one partition; (ii) to store a partition size in a FAT of the storage memory, wherein the partition size corresponds to a size of the enabled-storage area; and (iii) to increase, upon authorization, the partition size to include sectors in the reserved-storage area, thereby enabling expansion of the storage capacity in the storage device.

Preferably, the reserved-storage area is not accessible by a host system.

Preferably, the partition size is determined from a partition range stored in a master boot record in the storage memory, and wherein the partition range corresponds to a sector range of the enabled-storage area.

Most preferably, the partition range is determined from an enabled capacity stored in a memory-management area in the storage memory, and wherein the memory-management area is not accessible by a host system.

Preferably, the authorization is performed using a key provided to the storage device from a host system.

Preferably, the memory controller is further configured: (iv) to reformat the storage memory only upon receiving a permission verification.

Preferably, the increasing, by the memory controller, is performed without erasing content stored in the storage memory.

According to embodiments described herein, there is provided for the first time a business method for providing expandable storage capacity, the business method including the steps of: (a) providing a storage device including: (i) a storage memory having at least one partition; and (ii) a memory controller configured: (A) to designate a reserved-storage area and an enabled-storage area in at least one partition; (B) to store a partition size in a FAT of the storage memory, wherein the partition size corresponds to a size of the enabled-storage area; and (C) to increase, upon authorization, the partition size to include sectors in the reserved-storage area, thereby enabling expansion of the storage capacity in the storage device; and (b) offering the storage device for sale.

Preferably, the reserved-storage area is not accessible by a host system.

Preferably, the partition size is determined from a partition range stored in a master boot record in the storage memory, and wherein the partition range corresponds to a sector range of the enabled-storage area.

Most preferably, the partition range is determined from an enabled capacity stored in a memory-management area in the storage memory, and wherein the memory-management area is not accessible by a host system.

Preferably, the authorization is performed using a key provided to the storage device from a host system.

Preferably, the memory controller is further configured: (D) to reformat the storage memory only upon receiving a permission verification.

Preferably the increasing, by the memory controller, is performed without erasing content stored in the storage memory.

These and further embodiments will be apparent from the detailed description and examples that follow.

BRIEF DESCRIPTION OF THE DRAWINGS

Embodiments are herein described, by way of example only, with reference to the accompanying drawings, wherein:

FIG. 1A is a simplified schematic block diagram of a storage device, according to preferred embodiments described herein;

FIG. 1B is a simplified schematic block diagram of the memory allocation in a storage device of FIG. 1A;

DESCRIPTION OF THE PREFERRED EMBODIMENTS

Figure 2B:
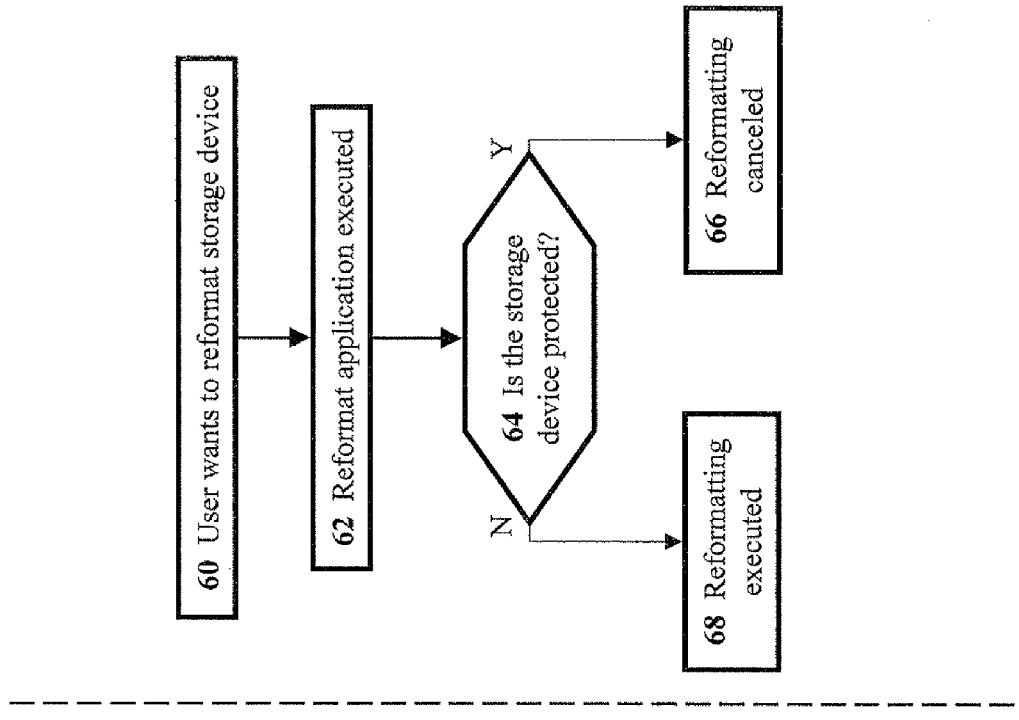
FIG. 2B is a simplified flowchart of the process of reformatting the storage device of FIGS. 1A and 1B, according to preferred embodiments described herein.

Embodiments described herein relate to methods and devices for expanding the storage capacity in a storage device in which the expansion process is performed solely by the storage device without erasing the existing content on the storage device. The principles and operation for expanding the storage capacity in a storage device, according to embodiments described herein, may be better understood with reference to the accompanying description and the drawings.

Referring now to the drawings, FIG. 1A is a simplified schematic block diagram of a storage device, according to preferred embodiments described herein. A storage device 10 is shown having a storage memory 12 and a memory controller 14. FIG. 1B is a simplified schematic block diagram of the memory allocation in the storage device of FIG. 1A. Storage memory 12 has a memory-management area 16 and a partition-data area 18. Storage memory 12 is formatted to its maximum capacity. Memory-management area 16 includes all necessary files to manage storage memory 12. Memory-management area 16 is not accessible by a host system, and is controlled by memory controller 14 (shown in FIG. 1A).

Partition-data area 18 includes a master boot record (MBR 20), a file allocation table (FAT 22), an enabled-storage area 24, and a reserved-storage area 26. Reserved-storage area 26 is not accessible by a host system. For simplicity, storage memory 12 is shown with only one partition.

Data stored in memory-management area 16 includes an actual capacity 28 and an enabled capacity 30. Actual capacity 28 indicates the full storage capacity of storage memory 12 (i.e. enabled-storage area 24 plus reserved-storage area 26), while enabled capacity 30 indicates the enabled storage capacity of storage memory 12 (i.e. enabled-storage area 24). Stored in a partition table in MBR 20 is an enabled-partition range 32, indicating the range of sectors for the enabled partition (which may be the sectors of enabled-storage area 24, or a smaller set of sectors if there is more than one partition). Partition range 32 is determined from enabled capacity 30. Stored in FAT 22 is a partition size 34, indicating the size of the enabled partition. Partition size 34 is determined from partition range 32.

Initially, at the time of manufacture, partition 34 is formatted in storage device 10 to its maximum capacity (i.e. actual capacity 28). Partition size 34 is then set to the size of enabled capacity 30 (which is lower than actual capacity 28). Such a condition is required to make sure that the format operation takes the hit sector range into account; this allows expansion of the storage capacity later on without reformatting. However, the OS of the host system will "look" at partition size 34 in FAT 22, so the OS will only "see" the reduced size.

In embodiments described herein, memory controller 14 may report actual capacity 28 in storage device 10, or only enabled capacity 30, depending on implementation and interoperability considerations. Also, depending on implementation and interoperability, MBR 20 may report actual capacity 28 or enabled capacity 30. For example, a storage device having 1,000 sectors will be formatted as 1,000-sector device. However, partition size 34 in FAT 22 will be modified from a default value of 1,000 of partition range 32 to 500 (assuming that the desired, enabled partition size is half of actual capacity 28).

In order to protect against an unauthorized user from accessing reserved-storage area 26 of storage device 10, any attempt by a host system to access a sector outside enabled capacity 30 as defined by enabled capacity 30 in memory-management area 16, will be refused by memory controller 14, and will result in an error message being sent to the host system. A user who manually changes partition size 34 in FAT 22 will still not be able to access the additional memory in reserved-storage area 26 because memory controller 14 will not allow writing to sectors that are outside enabled capacity 30.

Figure 2A:
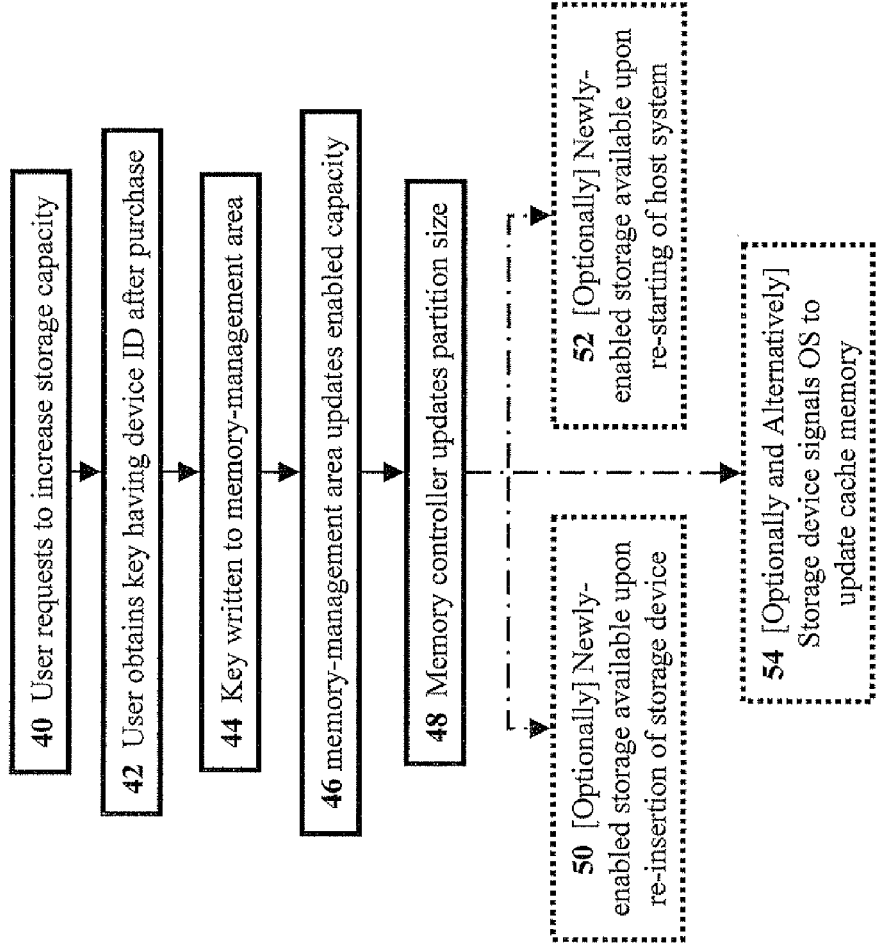
FIG. 2A is a simplified flowchart of the process of expanding storage capacity in the storage device of FIGS. 1A and 1B, according to preferred embodiments described herein.

FIG. 2 is a simplified flowchart of the process of expanding storage capacity in the storage device of FIGS. 1A and 1B, according to preferred embodiments described herein. In order for a user to increase enabled capacity 30 of storage device 10, the user first requests to increase the storage capacity (Step 40). The user is provided with an appropriate key (e.g. obtained from an authorized supplier of storage device 10 via download, on-line purchase, or call activation) that includes the specific device ID of storage device 10 (Step 42). The device ID may be marked on storage device 10, or written in a file stored in storage device 10, for example.

In other embodiments described herein, the key is provided to storage device 10 in one of the following methods (depending on the type of storage device and its intended use): providing the user with a dedicated application that will send the key to storage device 10, writing a specific file to storage device 10 in which the file contains the key (or the name of the file is the key, for example). As soon as the key is written to storage device 10 (Step 44), memory controller 14 updates enabled capacity 30 in memory-management area 16 (Step 46) and partition size 34 in FAT 22 (Step 48).

Depending on the type of storage device and the OS of the host system, it may be required to remove and re-insert storage device 10 (Step 50), or re-start the host system after increasing enabled capacity 30 (Step 52). The removal and re-insertion of storage device 10 (Step 50) may be performed logically (as opposed to physically) in some types of storage devices (e.g. USB devices). Alternatively, storage device 10 can signal the OS to refresh the device's cache memory (Step 54).

FIG. 2B is a simplified flowchart of the process of reformatting the storage device of FIGS. 1A and 1B, according to preferred embodiments described herein. If the user wishes to reformat storage device 10 (Step 60), special consideration is taken. The reformatting is performed using a special reformat application that the user executes from a host system (Step 62). If storage memory 12 is protected and such reformatting is forbidden (Step 64), as defined in memory-management area 16, memory controller 14 will not perform the reformatting (Step 66). If such reformatting is permitted, memory controller 14 will change partition size 34 (Step 68). The reformat application can also be configured to allow formatting in the same manner as the initial formatting as described above.

As an example of a use case, reserved-storage area 26 may contain pre-loaded content (e.g. music files). As soon as partition size 34 is increased, memory controller 14 updates FAT 22 with the file names and related metadata to present the content stored in reserved-storage area 26. In such a configuration, the additional storage provided to the user is not blank, but contains data (which the user can decide to keep or delete).

While the invention has been described with respect to a limited number of embodiments, it will be appreciated that many variations, modifications, and other applications of the invention may be made.

What is claimed is:

1. A method for expanding a storage capacity in a storage device, the method comprising the steps of:
   (a) creating at least one partition in a storage memory of the storage device;
   (b) designating a reserved-storage area and an enabled-storage area in said at least one partition;
   (c) storing a partition size in a file allocation table (FAT) of said storage memory, wherein said partition size corresponds to a size of said enabled-storage area;
   (d) upon authorization, increasing said partition size to include sectors in said reserved-storage area, thereby expanding the storage capacity in the storage device; and
   (e) updating an enabled capacity stored in a memory-management area in said storage memory to include an increased partition size.

2. The method of claim 1, wherein said reserved-storage area is not accessible by a host system.

3. The method of claim 1, wherein said partition size is determined from a partition range stored in a master boot record in said storage memory, and wherein said partition range corresponds to a sector range of said enabled-storage area.

4. The method of claim 3, wherein said partition range is determined from said enabled capacity stored in said memory-management area in said storage memory, and wherein said memory-management area is not accessible by a host system.

5. The method of claim 1, wherein said authorization is performed using a key provided to the storage device from a host system, wherein said key includes a device identification.

6. The method of claim 1, wherein said steps of creating, designating, storing, and increasing are performed by a memory controller in the storage device.

7. The method of claim 1, the method further comprising the step of:
   (f) reformatting said storage memory only upon receiving a permission verification.

8. The method of claim 1, wherein said step of increasing is performed without erasing content stored in said storage memory.

9. A storage device for enabling expansion of a storage capacity in the storage device, the device comprising:
   (a) a storage memory having at least one partition; and
   (b) a memory controller configured:
      (i) to designate a reserved-storage area and an enabled-storage area in said at least one partition;
      (ii) to store a partition size in a file allocation table (FAT) of said storage memory, wherein said partition size corresponds to a size of said enabled-storage area;
      (iii) to increase, upon authorization, said partition size to include sectors in said reserved-storage area, thereby enabling expansion of the storage capacity in the storage device,
      (iv) updating an enabled capacity stored in a memory-management area in said storage memory to include an increased partition size.

10. The device of claim 9, wherein said reserved-storage area is not accessible by a host system.

11. The device of claim 9, wherein said partition size is determined from a partition range stored in a master boot record in said storage memory, and wherein said partition range corresponds to a sector range of said enabled-storage area.

12. The device of claim 11, wherein said partition range is deter mined from said enabled capacity stored in said memory-management area in said storage memory, and wherein said memory-management area is not accessible by a host system.

13. The device of claim 9, wherein said authorization is performed using a key provided to the storage device from a host system, wherein said key includes a device identification.

14. The device of claim 9, wherein said memory controller is further configured:
   (v) to reformat said storage memory only upon receiving a permission verification.

15. The device of claim 9, wherein said increasing, by said memory controller, is performed without erasing content stored in said storage memory.

16. A business method for providing expandable storage capacity, the business method comprising the steps of:
   (a) providing a storage device including:
      (i) a storage memory having at least one partition; and
      (ii) a memory controller configured:
         (A) to designate a reserved-storage area and an enabled-storage area in said at least one partition;
         (B) to store a partition size in a file allocation table (FAT) of said storage memory, wherein said partition size corresponds to a size of said enabled-storage area; and
         (C) to increase, upon authorization, said partition size to include sectors in said reserved-storage area, thereby enabling expansion of a storage capacity in said storage device;
         (D) to update an enabled capacity stored in a memory-management area in said storage memory to include an increased partition size; and
   (b) offering said storage device for sale.

17. The business method of claim 16, wherein said reserved-storage area is not accessible by a host system.

18. The business method of claim 16, wherein said partition size is determined from a partition range stored in a master boot record in said storage memory, and wherein said partition range corresponds to a sector range of said enabled-storage area.

19. The business method of claim 18, wherein said partition range is determined from said enabled capacity stored in said memory-management area in said storage memory, and wherein said memory-management area is not accessible by a host system.

20. The business method of claim 16, wherein said authorization is performed using a key provided to said storage device from a host system, wherein said key includes a device identification.

21. The business method of claim 16, wherein said memory controller is further configured:
   (E) to reformat said storage memory only upon receiving a permission verification.

22. The business method of claim 16, wherein said increasing, by said memory controller, is performed without erasing content stored in said storage memory.

* * * * *